US010571869B2

(12) United States Patent
Su et al.

(10) Patent No.: US 10,571,869 B2
(45) Date of Patent: Feb. 25, 2020

(54) SYSTEMS FOR MODE SWITCHING IN AN APPLIANCE

(71) Applicant: Xiaomi Inc., Beijing (CN)

(72) Inventors: Jun Su, Beijing (CN); Anju Chen, Beijing (CN); Yi Wang, Beijing (CN); Zhuoli Yu, Beijing (CN)

(73) Assignee: XIAOMI INC., Beijing (CN)

( * ) Notice: Subject to any disclaimer, the term of this patent is extended or adjusted under 35 U.S.C. 154(b) by 340 days.

(21) Appl. No.: 14/842,600

(22) Filed: Sep. 1, 2015

(65) Prior Publication Data

US 2016/0124399 A1 May 5, 2016

Related U.S. Application Data

(63) Continuation-in-part of application No. PCT/CN2015/075025, filed on Mar. 25, 2015.

(30) Foreign Application Priority Data

Oct. 29, 2014 (CN) .......................... 2014 1 0596730

(51) Int. Cl.
*G05B 11/01* (2006.01)
*G05B 23/02* (2006.01)
*G05B 15/02* (2006.01)

(52) U.S. Cl.
CPC .............. *G05B 11/01* (2013.01); *G05B 15/02* (2013.01); *G05B 23/0267* (2013.01);
(Continued)

(58) Field of Classification Search
CPC ................... G05B 11/01; G05B 15/02; G05B 2219/24001; G05B 2219/2614;
(Continued)

(56) References Cited

U.S. PATENT DOCUMENTS 3,951,625 A * 4/1976 Follette ..................... F24F 3/14
  96/251
4,936,105 A * 6/1990 Takechi ................. F25D 29/00
  165/11.1
(Continued)

FOREIGN PATENT DOCUMENTS

CN 1477801 A 2/2004
CN 2663889 Y 12/2004
(Continued)

OTHER PUBLICATIONS

Alen BreatheSmart Air Purifier User Manual, Alen Live Better—Lifetime Limited Warranty, Alen Corp., 2012, 12 pages.
(Continued)

*Primary Examiner* — Kenneth M Lo
*Assistant Examiner* — Mohammad A Rahman
(74) *Attorney, Agent, or Firm* — Arch & Lake LLP (57) ABSTRACT

Described herein are systems for mode switching in an appliance, and related analysis and reporting. Associated methods can include determining, by circuitry of an appliance, that an operation of the appliance is abnormal. The determination can include sensing the abnormality and identifying that the operation of the appliance is an abnormal operation according to the sensing of the abnormality. The methods also include switching, by the circuitry, the operation of the appliance to a safe mode. The safe mode can include reducing power used with the operation (such as to stop or reduce speed of rotation of a fan in the appliance). The method also includes communicating, by the circuitry, information regarding the abnormality and/or that the abnormality was resolved, to an electronic device and/or a server. The electronic device can display the information on a display device. The server can generate statistics according to the information.

19 Claims, 7 Drawing Sheets

(52) U.S. Cl.
CPC ............... *G05B 23/0291* (2013.01); *G05B 2219/24001* (2013.01); *G05B 2219/2614* (2013.01); *G05B 2219/2638* (2013.01); *G05B 2219/31422* (2013.01)

(58) Field of Classification Search
CPC .. G05B 2219/2638; G05B 2219/31422; G05B 23/0267; G05B 23/0291
See application file for complete search history.

(56) References Cited

U.S. PATENT DOCUMENTS

| | | | | |
|---|---|---|---|---|
| 6,000,232 | A * | 12/1999 | Witten-Hannah | F25D 17/065 165/208 |
| 6,989,731 | B1 * | 1/2006 | Kawai | G05B 19/0428 340/3.1 |
| 8,145,546 | B2 * | 3/2012 | Coveley | G06Q 50/24 705/28 |
| 8,559,937 | B2 | 10/2013 | Ram et al. | |
| 8,786,425 | B1 * | 7/2014 | Hutz | H04M 11/04 340/506 |
| 9,785,351 | B2 * | 10/2017 | Resch | G06F 3/061 |
| 2002/0130784 | A1 | 9/2002 | Suzuki et al. | |
| 2003/0152480 | A1 * | 8/2003 | Sham | A61L 2/202 422/28 |
| 2004/0027336 | A1 * | 2/2004 | Ishii | B60R 25/102 345/169 |
| 2004/0122531 | A1 * | 6/2004 | Atsuta | H04L 12/2803 700/1 |
| 2004/0214566 | A1 | 10/2004 | Suzuki et al. | |
| 2005/0120112 | A1 * | 6/2005 | Wing | G06Q 10/06 709/224 |
| 2005/0231354 | A1 * | 10/2005 | Riedel | A61N 1/39 340/531 |
| 2006/0086000 | A1 | 4/2006 | Lee | |
| 2006/0244403 | A1 * | 11/2006 | Christensson | H04N 7/186 318/280 |
| 2007/0118638 | A1 | 5/2007 | Ban et al. | |
| 2010/0070085 | A1 | 3/2010 | Harrod et al. | |
| 2010/0070086 | A1 | 3/2010 | Harrod et al. | |
| 2010/0070089 | A1 | 3/2010 | Harrod et al. | |
| 2010/0070093 | A1 | 3/2010 | Harrod et al. | |
| 2010/0070907 | A1 | 3/2010 | Harrod et al. | |
| 2010/0244759 | A1 * | 9/2010 | Makley | F04D 27/008 318/478 |
| 2010/0288260 | A1 * | 11/2010 | Castelli | F24C 3/128 126/42 |
| 2011/0033346 | A1 * | 2/2011 | Bohlen | A61L 9/205 422/186.3 |
| 2012/0042066 | A1 * | 2/2012 | Chatterjee | H04L 41/0663 709/224 |
| 2012/0105424 | A1 * | 5/2012 | Lee | G09F 9/35 345/212 |
| 2012/0253523 | A1 | 10/2012 | Harrod et al. | |
| 2012/0310418 | A1 | 12/2012 | Harrod et al. | |
| 2013/0066472 | A1 | 3/2013 | Harrod et al. | |
| 2014/0055167 | A1 * | 2/2014 | Oh | G01R 31/024 327/63 |
| 2014/0067164 | A1 * | 3/2014 | Papadopoulos | B64G 1/002 701/3 |
| 2014/0118148 | A1 * | 5/2014 | Edlund | G08B 21/0423 340/573.1 |
| 2014/0201315 | A1 * | 7/2014 | Jacob | H04L 12/2803 709/217 |
| 2014/0239891 | A1 * | 8/2014 | Martin | B60L 53/36 320/108 |
| 2014/0300930 | A1 * | 10/2014 | Kawai | G03G 15/50 358/1.15 |
| 2016/0003491 | A1 * | 1/2016 | D'Orlando | F24F 11/001 702/184 |
| 2016/0147207 | A1 * | 5/2016 | Park | G08C 17/00 700/275 |
| 2017/0207668 | A1 * | 7/2017 | Kanno | H02J 50/12 |

FOREIGN PATENT DOCUMENTS

| | | |
|---|---|---|
| CN | 102222875 A | 10/2011 |
| CN | 202205064 U | 4/2012 |
| CN | 102520695 A | 6/2012 |
| CN | 102759176 A | 10/2012 |
| CN | 103517064 A | 1/2014 |
| CN | 103733475 A | 4/2014 |
| CN | 104102194 A | 10/2014 |
| GB | 1231799 A | 5/1971 |
| JP | H06207810 A | 7/1994 |
| JP | H10-141733 A | 5/1998 |
| JP | 2003-302093 A | 10/2003 |
| JP | 2004-077078 A | 3/2004 |
| JP | 2005-309724 A | 11/2005 |
| JP | 2011-094920 A | 5/2011 |
| KR | 10-2006-0004697 A | 1/2006 |
| KR | 10-2014-0061580 A | 5/2014 |
| RU | 2495471 C1 | 10/2013 |

OTHER PUBLICATIONS

International Search Report issued in corresponding International Application No. PCT/CN2015/075025, dated Jul. 1, 2015, 4 pages.
Extended European Search Report issued in corresponding EP Application No. 15180150, dated Feb. 24, 2016, 14 pages.
Office Action (including English translation) issued in corresponding Korean Patent Application No. 10-2015-7013330, dated Jun. 15, 2016, 20 pages.
Office Action (including English translation) issued in corresponding Russian Patent Application No. 2015125536, dated Aug. 25, 2016, 12 pages.
Office Action (including English translation) issued in corresponding Chinese Patent Application No. 201410596730.2, dated Aug. 26, 2016, 27 pages.
Office Action (including English translation) issued in corresponding Korean Patent Application No. 10-2015-7013330, dated Nov. 10, 2016, 20 pages.
Office Action (including English translation) issued in corresponding Japanese Patent Application No. 2016-555902, dated Jan. 10, 2017, 10 pages.
First Office Action issued to Indian Patent Application No. 1414/KOLNP/2015, dated Nov. 25, 2019 with English translation, (10p).

* cited by examiner

SYSTEMS FOR MODE SWITCHING IN AN APPLIANCE

CROSS-REFERENCE TO RELATED APPLICATIONS

This application is a continuation-in-part of International Application No. PCT/CN2015/075025, filed Mar. 25, 2015, which is based upon and claims priority to Chinese Patent Application No. 201410596730.2, filed Oct. 29, 2014, the entire contents of which are incorporated herein by reference.

TECHNICAL FIELD

The present disclosure relates to the field of automatic control, and more particularly, to systems for mode switching in an appliance.

BACKGROUND

With the popularity of a wide variety of appliances (such as household electrical appliances), when using the appliances, users pay increasingly more attention to the safety performance of the appliances. In related arts, a fan, for example, is usually disposed in an appliance, such as a refrigerator, an air conditioner, a humidifier, or an air purifier. Sometimes, these appliances become abnormal while being used, but a user may not necessarily find the abnormality in time. For example, in some instances, a fan will run with an abnormality which can cause damage to the appliance or its surroundings. Also, there are certain potential safety hazards associated with such abnormalities. Currently, abnormal operations in appliances may be discovered and then turned off manually. In some instances, there are automated shutdown functions. Described herein are example technical solutions to the technical problems that may occur from abnormalities in operation of appliances.

SUMMARY

Example embodiments are described herein of the systems for providing mode switching. These examples include technical solutions to technical problems with occurrences of abnormalities in appliances. Examples may include a method for mode switching which is applied in an appliance (such as a household electrical appliance). The method may include detecting whether an operation status is abnormal (such as an abnormality in a self-operation status). If the operation status is abnormal, the method can include switching an operation mode into a safe mode and operating in the safe mode. The safe mode can include at least one of powering off a motor in the appliance, providing an alarm, and reducing speed of or stopping rotation of a fan in the appliance. When an appliance is connected with an electronic device (such as a mobile device via a wireless connection), the method can include communicating abnormality information to the electronic device. The electronic device can be configured to display the abnormality information on a display interface of the electronic device. The abnormality information can include at least one of an abnormality position, an abnormality problem, abnormality time, and an abnormality image.

Examples may also include a method for mode switching which is applied in an electronic device (such as a mobile device connected wirelessly to a household appliance). The method can include receiving abnormality information communicated by an appliance. The abnormality information can be communicated by the appliance after the appliance detects that an operation status of the appliance is abnormal (such as an abnormality in a self-operation status). The method can also include displaying the abnormality information on a display interface of the electronic device. The abnormality information can include at least one of an abnormality position, an abnormality problem, abnormality time, and an abnormality image.

Whether an operation status is abnormal is detected, an operation mode is switched into a safe mode if the operation status is abnormal, and the appliance operates in the safe mode, and communicates the abnormality information to an electronic device when the household electrical appliance is connected with the electronic device. Thus, solving a problem of a user not finding the abnormality in the appliance in time. Also, relatively high potential safety hazards are resolved that could remain from user error or negligence. Consequently, the abnormality of the appliance is discovered in a more timely fashion so as to effectively reduce the extent of damage of the appliance and the potential safety hazards (such as hazards that can occur while the user is using or maintaining the appliance.

For example, the disclosure herein provides systems for mode switching in an appliance, and related analysis and reporting. Associated methods can include determining, by circuitry of an appliance, that an operation of the appliance is abnormal. The determination can include sensing the abnormality and identifying that the operation of the appliance is an abnormal operation according to the sensing of the abnormality. The method also includes switching, by the circuitry, the operation of the appliance to a safe mode. The safe mode can include reducing power used with the operation (such as to stop or reduce speed of rotation of a fan in the appliance). The method also includes communicating, by the circuitry, information regarding the abnormality and/or that the abnormality was resolved, to an electronic device and/or a server. The circuitry can be communicatively coupled with the electronic device and/or the server over a LAN, WAN, a wireless network, the Internet, or any combination thereof. The electronic device can display the information on a display device (such as a display of the electronic device). The server can generate statistics according to the information. The information can include a position of the abnormality, an issue with the abnormality, a time associated with the position and the issue, and an image of the abnormality at the time associated with the position and the issue. The information can also include an image illustrating the abnormal operation and/or an image illustrating how to resolve the abnormal operation. The abnormality may include a door of the appliance being open beyond a predetermined threshold period of time, a foreign object in or on the appliance, and/or obstruction by an external force beyond a predetermined threshold.

This summary and the following detailed descriptions are merely exemplary and do not limit the present disclosure.

BRIEF DESCRIPTION OF THE DRAWINGS

Non-limiting and non-exhaustive examples are described with reference to the following figures. The components in the drawings are not necessarily to scale, and like referenced numerals designate corresponding parts throughout the different views.

DETAILED DESCRIPTION

Subject matter described herein is intended to be construed as not being limited to examples set forth herein; examples are provided merely to be illustrative. The following detailed description is not intended to be limiting on the scope of what is claimed.

In example embodiments described herein, appliances may include any industrial, household, or commercial appliance. Such as any appliance including a fan (e.g., air conditioners, humidifiers, air purifiers, or HVAC systems). In examples, an electronic device may be a mobile phone (such as a smart phone), a tablet computer (or any other type of personal computer), an e-book reader, a MP3 (Moving Image Experts Group Audio Layer III) player, a MP4 (Moving Image Experts Group Audio Layer IV) player, or a smart TV.

Figure 1:
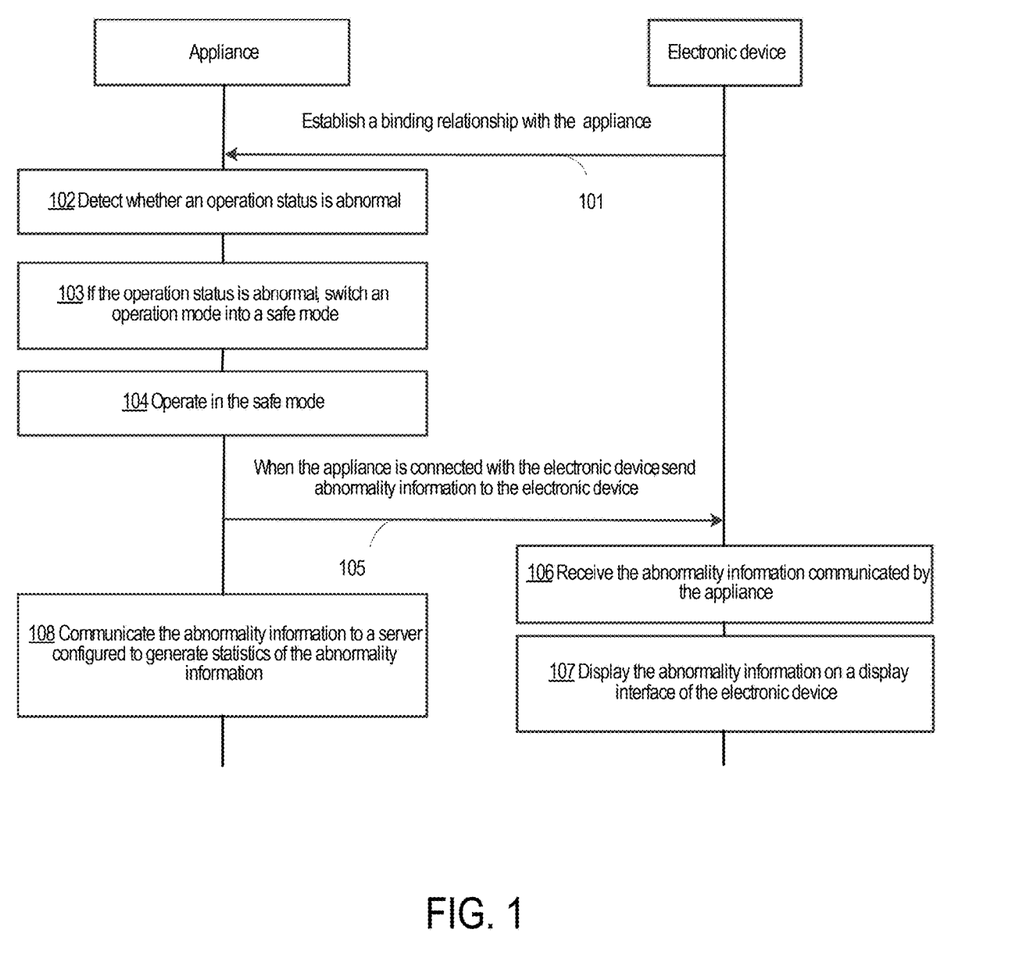
FIG. 1 is a flow chart of an example method for mode switching.

FIG. 1 is a flow chart of an example method for mode switching. The example illustrated in this method for mode switching is applied in an appliance (such as a household electrical appliance) and an electronic device. The method for mode switching may include the following operations. In operation 101, the electronic device establishes a binding relationship with the appliance in advance. The electronic device may establish the binding relationship between the electronic device and the appliance according to the identity of the appliance and the identity of the electronic device. The appliance receives a control signal communicated by an electronic device that establishes the binding relationship with the appliance. For instance, when the appliance is an air purifier and the electronic device is a smartphone, if a two-dimensional code identity exists on the surface of the air purifier, the smartphone may acquire the identity of the air purifier through scanning the two-dimensional code identity, and establish a binding relationship between the air purifier and the smartphone according to the acquired identity of the air purifier and the identity of the smartphone itself. The air purifier receives a control signal communicated by the electronic device that establishes the binding relationship with the air purifier.

In operation 102, the appliance detects whether an operation status (such as a self-operation status) is abnormal. For example, this can occur during operation of appliance. For instance, when the appliance is an air purifier, the air purifier detects whether a self-operation status is abnormal during operation process.

In an example, the operation 102 may include the following sub-operations. First, the appliance detects whether a door is opened. The door in the appliance may include at least one of a top door with blades, a lower door and a back filter door, of which can be opened. In the appliance, any one of an R-type switch, a microswitch or a magnetomotive switch may be additionally equipped in advance at these doors. When any door is opened, the above switches may be triggered. The appliance detects whether a door is opened through the trigger condition of any switch mentioned-above. For instance, when the appliance is an air purifier, the air purifier detects whether a door is opened. Second, if the door is opened, the appliance is determined to be abnormal. If any door in the appliance is opened, the appliance is determined to be abnormal. For instance, when the appliance is an air purifier, the air purifier is determined to be abnormal if any door in the air purifier is opened.

In an example, the operation 102 may include the following sub-operations. First, the appliance detects whether a foreign object exists. A foreign object may exist in grilles of the appliance sometimes. The appliance detects whether the foreign object exists. For instance, when the appliance is an air purifier, the air purifier detects whether the foreign object exists. Second, if the foreign object exists, the appliance is determined to be abnormal. If the foreign object exists in grilles, the appliance is determined to be abnormal. For instance, when the appliance is an air purifier, the air purifier is determined to be abnormal if the foreign object exists in grilles of the air purifier.

In an example, the operation 102 may include the following sub-operations. First, the appliance detects whether a normal operation is obstructed by an external force. Two example types of possible external forces obstructing a normal operation in the appliance. For example, when heavy things are placed at an air outlet, purifying efficiency will be severely affected, and thereby a normal operation of the appliance is obstructed. For example, when the air outlet is very close to a wall surface, excessive atmospheric pressure is caused due to the reflection of the wall surface, which obstructs the normal operation of the appliance. For instance, when the appliance is an air purifier, the air purifier detects whether the normal operation is obstructed by the external force. Second, if the external force is larger than a first threshold, the appliance is determined to be abnormal. The first threshold may either be set by a user according to usage condition, or be set in advance by a device maintaining personnel. For instance, when the appliance is an air purifier, the air purifier is determined to be abnormal if the external force is larger than the first threshold.

In operation 103, if the appliance is abnormal, the appliance switches an operation mode into a safe mode. If the appliance is abnormal, the appliance switches the operation mode into the safe mode. For instance, when the appliance is an air purifier, the operation mode is switched to the safe mode if the air purifier is abnormal.

In operation 104, the appliance operates in the safe mode. The safe mode includes at least one of powering off a motor in the appliance, providing an alarm and reducing speed of or stopping rotation of a fan in the appliance. When the appliance is abnormal since a door is opened or the normal operation is obstructed by an external force, the appliance may power off the motor and give an alarm at the same time. After the motor is powered off, a fan still runs, but its rotational speed is slowed. When the appliance is abnormal since a foreign object exists in grilles, the appliance may power off the motor and give an alarm at the same time. The appliance may also trigger to lock a rotating shaft to stop the operation of the fan immediately. When more than one fan exist in the appliance, and when the appliance is abnormal since a foreign object exists in a top grille, a top fan at this position may stop rotating immediately or several the fans in the appliance may stop rotating. When the appliance is abnormal since a foreign object exists in a bottom grille, a lower fan at this position may stop rotating immediately or several of the fans in the appliance may stop rotating. For instance, when the appliance is an air purifier, the air purifier runs in the safe mode due to such abnormalities.

In operation 105, when the appliance is connected with the electronic device, the appliance communicates abnormality information to the electronic device. The electronic device is configured to display the abnormality information on a display interface of the electronic device, and the abnormality information includes at least one of an abnormality position, an abnormality problem, abnormality time, and an abnormality image. When a camera exists at the region where the appliance locates or at the abnormality position of the appliance, the electronic device may receive the abnormality information corresponding to the abnormality position captured by the camera. For instance, when the appliance is an air purifier and a camera exists at the region where the air purifier locates or at the abnormality position of the air purifier, the air purifier communicates the abnormality information to the electronic device.

Operation 105 may be implemented through the following three ways, for example. In a first example way, the appliance communicates the abnormality information to the electronic device through a wireless connection established with the electronic device. The wireless connection may be a blue tooth connection or a WIFI (Wireless-Fidelity) connection. For instance, when the appliance is an air purifier, the air purifier communicates the abnormality information to the electronic device through a wireless connection established with the electronic device.

In a second example way, the appliance communicates, through a gateway device, the abnormality information to the electronic device belonging to the same LAN with the appliance. That is, the appliance and the electronic device belong to the same LAN, and the appliance and the electronic device may communicate with each other through a gateway device. For instance, when the appliance is an air purifier, the air purifier communicates, a gateway device, the abnormality information to the electronic device belonging to the same LAN with the appliance.

In a third example way, the appliance communicates the abnormality information to the electronic device through the Internet. For instance, when the appliance is an air purifier, the air purifier communicates the abnormality information to the electronic device through the Internet.

In operation 106, the electronic device receives the abnormality information communicated by the appliance. When the appliance is connected with the electronic device, the electronic device receives the abnormality information communicated by the appliance. For instance, when the appliance is an air purifier, the electronic device receives the abnormality information communicated by the air purifier when the air purifier is connected with the electronic device.

Operation 106 may be implemented through the following three ways, for example. In a first example way, the electronic device receives the abnormality information communicated by the appliance through a wireless connection established with the appliance. The wireless connection may be a blue tooth connection or a WIFI connection. In a second example way, the electronic device receives, through a gateway device, the abnormality information communicated by the appliance belonging to the same LAN with the electronic device That is, the appliance and the electronic device belong to the same LAN, and the appliance and the electronic device may communicate with each other through a gateway device. In a third example way, the electronic device receives the abnormality information communicated by the appliance through the Internet.

In operation 107, the electronic device displays the abnormality information on a display interface of the electronic device. The abnormality information includes at least one of an abnormality position, an abnormality problem, abnormality time, and an abnormality image. For instance, when the electronic device is a smartphone, the abnormality information is displayed on the display interface of the smartphone.

The abnormality information includes at least one of an abnormality position, an abnormality problem, abnormality time, and an abnormality image. In an example, when the abnormality information includes at least one of an abnormality position, an abnormality problem and abnormality time, the abnormality information is displayed on the display interface of the electronic device. When the abnormality information includes an abnormality image, the abnormality information is displayed on the display interface of the electronic device.

Figure 2:
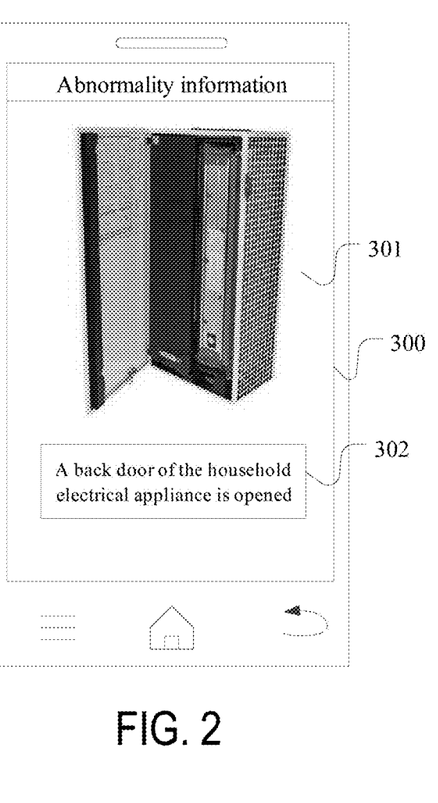
FIGS. 2 and 3 are depictions of an interface related to an example method for mode switching.

For instance, referring to FIG. 2, illustrated is a block diagram of an example interface displaying abnormality information on a display interface 300 of an electronic device in a form of image 301. The abnormality problem 302 is that a back door of an appliance is opened. When the abnormality position in the abnormality information is displayed in a block diagram of an appliance, the abnormality position and other positions in the block diagram of the appliance are distinctively displayed. The distinctive display includes at least one of distinctive display via colors, distinctive display via animations and distinctive display via profiles.

Figure 3:
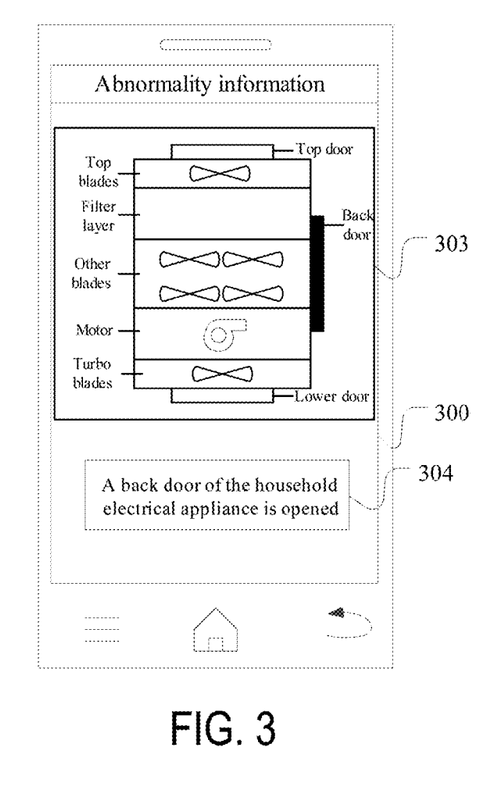

For instance, referring to FIG. 3, illustrated is a block diagram of the interface displaying the abnormality information on a display interface 300 of an electronic device in a form of a block diagram 303 of an appliance. The abnormality problem 304 is that a back door of the appliance is opened. In the block diagram 303 of the appliance, the abnormality position (e.g., the back door) and other positions in the block diagram of the appliance are distinctively displayed via colors. As shown in FIG. 3, the abnormality position at the back door is displayed in black, and other positions are displayed without any fill-in color or pattern. For instance, when the appliance is an air purifier, and the abnormality position in the abnormality information is displayed in a block diagram of the air purifier, the abnormality position and other positions in the block diagram of the air purifier are distinctively displayed.

In operation 108, the appliance communicates the abnormality information to a server. The server is configured to make statistics of the abnormality information. Operation 308 may be performed at any time after the operation 105. For instance, when the appliance is an air purifier, the air purifier communicates the abnormality information to a server which is configured to make statistics of the abnormality information.

Also, in the method for mode switching provide in these examples, abnormality information is communicated to a server which is configured to make statistics of the abnormality information. In such examples, a manufacturer may use and generate statistics of the abnormality information of appliances through the server.

Figure 4:
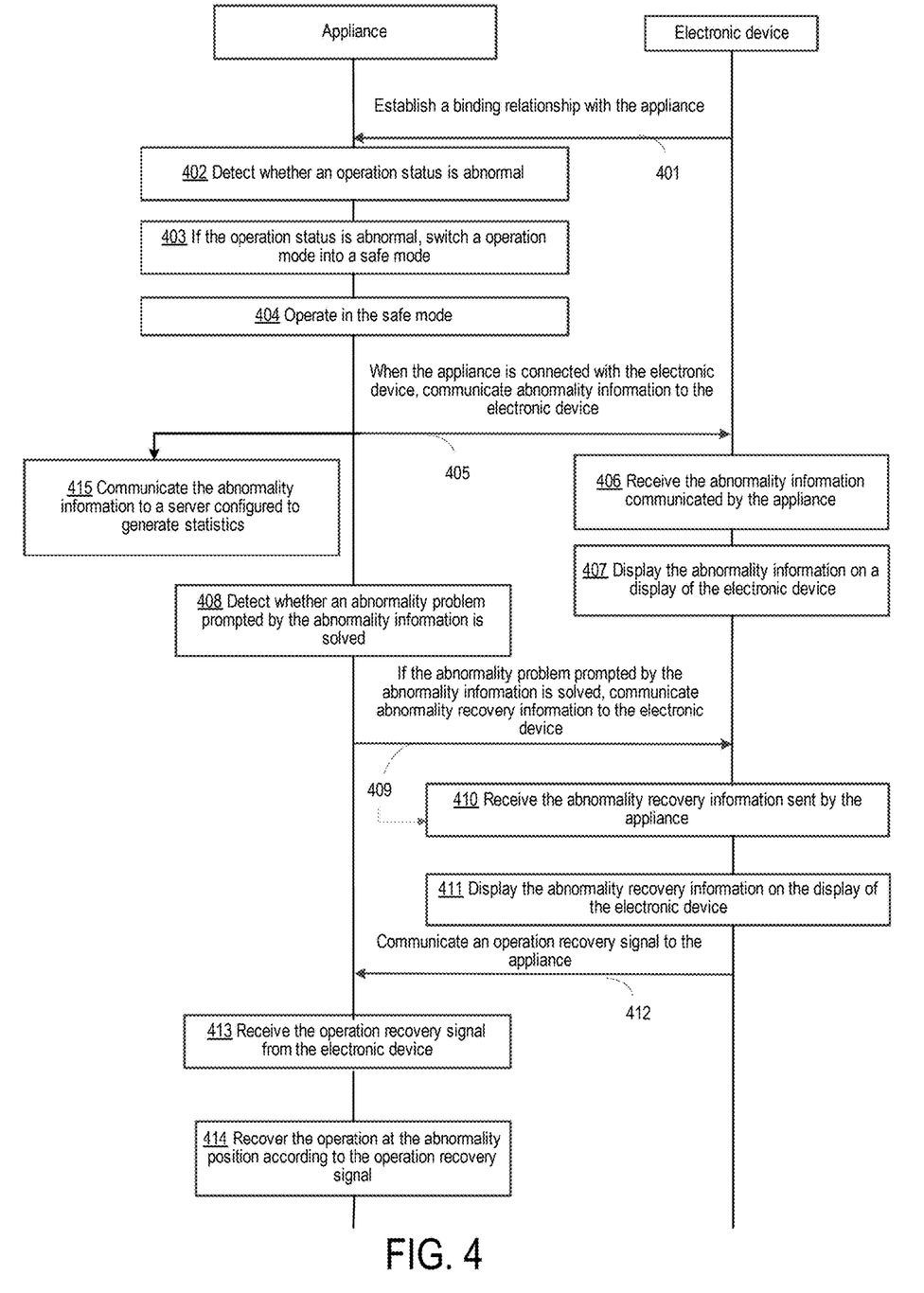
FIG. 4 is a flow chart of an example method for mode switching.

FIG. 4 is a flow chart of another example method for mode switching. The example is implemented in an appliance (such as a household electrical appliance) and an electronic device (such as a smartphone, tablet, or smart TV). The method for mode switching may include the following operations. In operation 401, the electronic device establishes a binding relationship with the appliance in advance. For instance, when the electronic device is a smart TV, the smart TV may establish the binding relationship between the appliance and the smart TV according to the identity of the appliance and the identity of the smart TV. The appliance receives a control signal communicated by the smart TV that establishes the binding relationship with the appliance.

In operation 402, the appliance detects whether a self-operation status is abnormal. The possible implementation ways included in operation 402 may be the same with the implementation ways involved in operation 102 in the foregoing example, which thus will not be elaborated herein.

In operation 403, if the operation status is abnormal, the appliance switches an operation mode into a safe mode.

In operation 404, the appliance operates in the safe mode. The safe mode includes at least one of powering off a motor in the appliance, providing an alarm and reducing speed of or stopping rotation of a fan in the appliance.

In operation 405, when the appliance is connected with the electronic device, the appliance communicates abnormality information to the electronic device. The electronic device is configured to display the abnormality information on a display interface of the electronic device, and the abnormality information includes at least one of an abnormality position, an abnormality problem, abnormality time, and an abnormality image. When a camera exists at the region where the appliance locates or at the abnormality position of the appliance, the appliance may capture the abnormality position through the camera and communicate the abnormality information corresponding to the abnormality position to the electronic device.

In operation 406, the electronic device receives the abnormality information communicated by the appliance. When the appliance and the electronic device are connected, the electronic device receives the abnormality information communicated by the appliance.

In operation 407, the electronic device displays the abnormality information on a display interface of the electronic device. The abnormality information includes at least one of an abnormality position, an abnormality problem, abnormality time, and an abnormality image. For instance, when the electronic device is a smart TV, the abnormality information is displayed on a display interface of the smart TV. The abnormality information includes at least one of an abnormality position, an abnormality problem, abnormality time, and an abnormality image. When the abnormality information includes at least one of an abnormality position, an abnormality problem and abnormality time, the abnormality information is displayed on a display interface of the electronic device photographically. When the abnormality information includes an abnormality image, the abnormality information is displayed on the display interface of the electronic device illustratively. When the abnormality position in the abnormality information is displayed in the block diagram of the appliance, the abnormality position and other positions in the block diagram of the appliance are distinctively displayed. The distinctive display includes at least one of distinctive display via colors, distinctive display via animations and distinctive display via profiles.

In operation 408, the appliance detects whether the abnormality problem prompted by the abnormality information is solved. When a camera exists at the region where the appliance locates or at the abnormality position of the appliance, the appliance may capture the abnormality position through the camera; if the operation at the abnormality position is recovered back to normal, then the abnormality problem is solved.

In operation 409, if the abnormality problem prompted by the abnormality information is solved, the appliance communicates abnormality recovery information to the electronic device. The electronic device is configured to display the abnormality recovery information on the display interface of the electronic device.

In operation 410, the electronic device receives the abnormality recovery information communicated by the appliance.

In operation 411, the electronic device displays the abnormality recovery information on the display interface of the electronic device. For instance, when the electronic device is a smart TV, the abnormality recovery information is displayed on a display interface of the smart TV. When the abnormality recovery information includes at least one of an abnormality recovery position, an abnormality recovery problem and abnormality recovery time, the abnormality recovery information is displayed on a display interface of the electronic device photographically. The user may compare the abnormality recovery information with the abnormality information.

When the abnormality recovery information includes an abnormality recovery image, the abnormality recovery information is displayed on the display interface of the electronic device as an illustration. The user may compare the abnormality recovery information with the abnormality information. When the abnormality recovery position in the abnormality recovery information is displayed in a block diagram of the appliance, both the abnormality recovery position and other positions in the block diagram of the appliance are displayed normally. The user may compare the abnormality recovery information with the abnormality information.

In operation 412, the electronic device communicates an operation recovery signal to the appliance. The operation recovery signal is configured to instruct the appliance to recover the operation at the abnormality position. The electronic device communicates the operation recovery signal to the electronic device. The operation recovery signal may be triggered when a user clicks the abnormality recovery position in a block diagram of the appliance. For instance, the abnormality recovery problem is that a top door with blades of the appliance is closed. When the top door with blades is closed, the electronic device is triggered to communicate an operation recovery signal to the appliance when a user clicks the position of the top door with blades in the block diagram of the appliance. The operation recovery signal is configured to restore the power supply of a motor at the position of the top door with blades. For instance, the abnormality recovery problem is that a foreign object at the position of a top grille of the appliance is removed; when the foreign object is removed, the electronic device is triggered to communicate an operation recovery signal to the appliance when a user clicks the position of the top grille in the block diagram of the appliance. The operation recovery signal is configured to recover the operation of a fan at the position of the top grille. For instance, the abnormality recovery problem is that a heavy thing at the position of the top grille of the appliance instructing the normal operation of the appliance is taken away; when the heavy thing is taken away and thereby does not instruct the normal operation of the appliance, the electronic device is triggered to communicate an operation recovery signal to the appliance when a user clicks the position of the top grille in the block diagram of the appliance. The operation recovery signal is configured to restore the power supply of a motor at the position of the top grille.

In operation 413, the appliance receives the operation recovery signal from the electronic device. For instance, the abnormality problem is that a top door with blades of the appliance is opened; the appliance receives the operation recovery signal communicated by the electronic device after the top door with blades is closed. For instance, the abnormality problem is that a foreign object exists in the position of a top grille of the appliance; the appliance receives the operation recovery signal communicated by the electronic device after foreign object is removed. For instance, the abnormality problem is that a heavy thing instructing the normal operation of the appliance exists at the position of a top grille of the appliance; when the heavy thing is taken away and thereby does not instruct the normal operation of the appliance, the appliance receives the operation recovery signal communicated by the electronic device.

In operation 414, the appliance recovers the operation at the abnormality position according to the operation recovery signal. For instance, the abnormality position is the position of a top door with blades of the appliance, and the abnormality problem is that the top door with blades is opened; when the abnormality problem is solved, e.g., the top door with blades is closed, the appliance recovers the operation at the abnormality position according to the operation recovery signal, e.g., the appliance restores the power supply at the position of the top door with blades according to the operation recovery signal. For instance, the abnormality position is the position of a top grille of the appliance, and the abnormality problem is that a foreign object exists at the position of the top grille; when the abnormality problem is solved, e.g., the foreign object is removed, the appliance restores the operation of the abnormality position according to the operation recovery signal, e.g., the appliance restores the operation of a fan at the position of the top grille according to the operation recovery signal. For instance, the abnormality position is the position of a top grille of the appliance, and the abnormality problem is that a heavy thing exists at the position of the top grille and the heavy thing thereby instructs the normal operation of the appliance; when the abnormality problem is solved, e.g., the heavy thing is taken away and does not instruct the normal operation of the appliance, the appliance restores the operation at the abnormality position according to the operation recovery signal, e.g., the appliance restores the power supply of a motor at the position of the top grille according to the operation recovery signal.

In operation 415, the appliance communicates the abnormality information to a server which is configured to make statistics of the abnormality information.

Operation 415 may be performed at any time after operation 405. Also, in the method for mode switching provided by the present example, whether the abnormality problem prompted by the abnormality information is solved is detected, and abnormality recovery information is communicated to the electronic device if the abnormality problem prompted by the abnormality information is solved. Whether the abnormality problem is solved can be monitored in real time. Also, in the method for mode switching, operation recovery signal from the electronic device is received, and the operation at the abnormality position is recovered according to the operation recovery signal. The operation may be automatically recovered without manual recovery. Also, in the method for mode switching provided by the present example, abnormality information is communicated to a server configured to make statistics of the abnormality information. A manufacturer may access and generate statistics of the abnormality information of appliances through the server.

Examples of devices are described, with respect to FIGS. 5-8, which may be used for performing example aspects of the methods described herein. Details not described with respect to these figures may be provided by descriptions of the methods, and vice versa.

Figure 5:
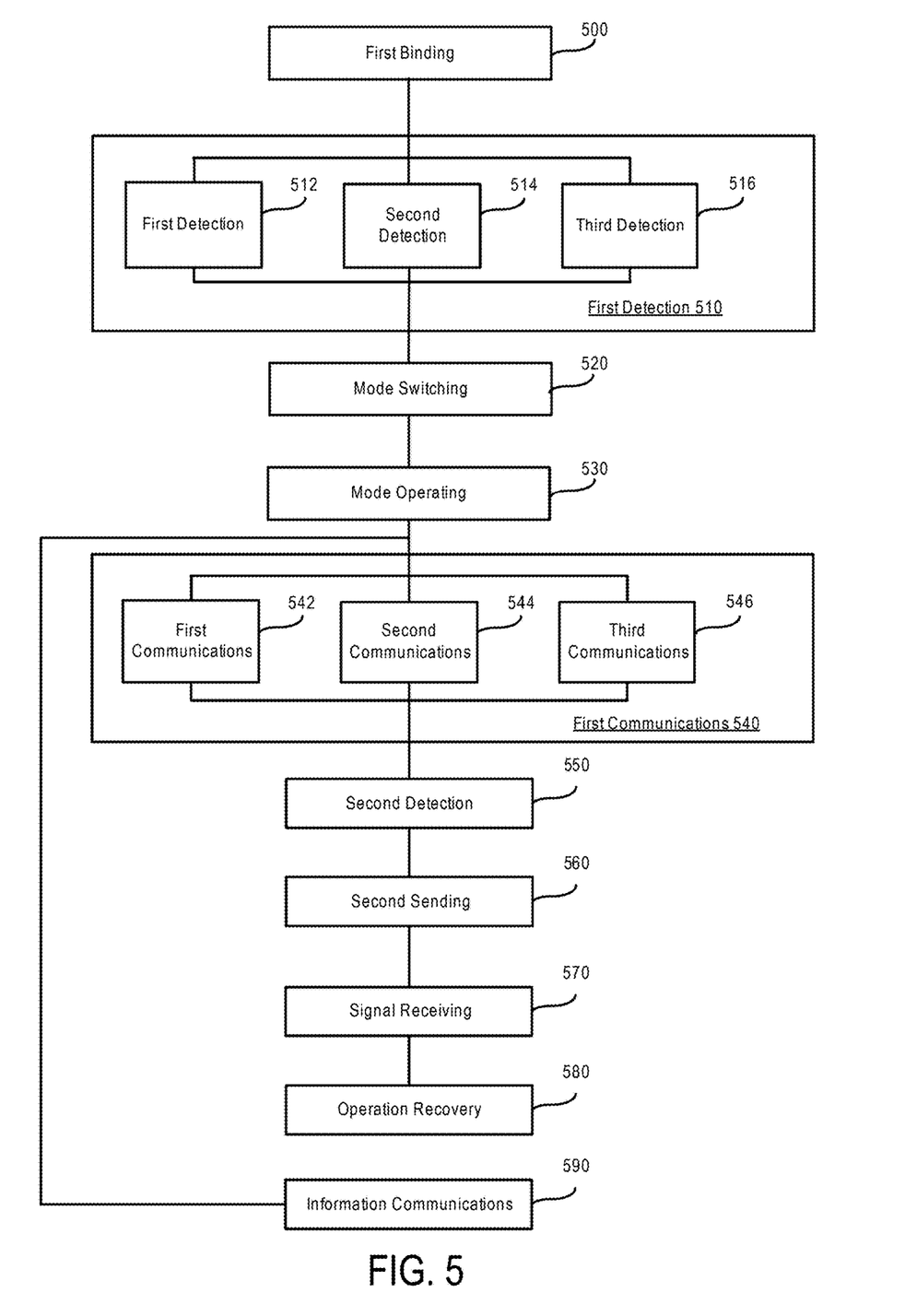
FIGS. 5-8 are block diagrams of example devices for mode switching.

FIG. 5 is a block diagram of an example device for mode switching. The device for mode switching may implemented with an appliance (such as a household electrical appliance) through software, hardware, or a combination thereof. The device for mode switching may include first detection circuitry 510 configured to detect whether a self-operation status is abnormal. The device may also include mode switching circuitry 520 configured to, when the operation status is abnormal, switch the operation mode into a safe mode. The device may also include mode operating circuitry 530 configured to operate in the safe mode. The safe mode may include at least one of powering off a motor in the appliance, providing an alarm, and reducing speed of or stopping rotation of a fan in the appliance. The device may also include first communications circuitry 540 configured to, when the appliance is connected with an electronic device, communicate abnormality information to the electronic device. The electronic device may be configured to display the abnormality information on a display interface of the electronic device, and the abnormality information may include at least one of an abnormality position, an abnormality problem, abnormality time, and an abnormality image.

The first detection circuitry 510 may include a first detection sub-circuitry 512 configured to detect whether a door is opened. When the door is opened, this circuitry may determine that the appliance is abnormal.

The first detection circuitry 510 may also include second detection sub-circuitry 514 configured to detect whether a foreign object exists. When the foreign object exists, this sub-circuitry may determine that the appliance is abnormal.

The first detection circuitry 510 may also include third detection sub-circuitry 516 configured to detect whether normal operation is obstructed by an external force. When the door is opened, for example, this sub-circuitry may determine that the appliance is abnormal.

Also, the device may include second detection circuitry 550 configured to detect whether the abnormality problem prompted by the abnormality information is solved. Also, the device may include second communications circuitry 560 configured to, when the abnormality problem prompted by the abnormality information is solved, communicate abnormality recovery information to the electronic device. The electronic device being configured to display the abnormality recovery information on the display interface of the electronic device.

Also, the device may include signal receiving circuitry 570 configured to receive an operation recovery signal from the electronic device. The device may also include an operation recovery circuitry 580 configured to recover the operation at the abnormality position according to the operation recovery signal. The device may also include information communications circuitry 590 configured to communicate the abnormality information to a server, the server being configured to count the abnormality information.

The first communications circuitry 540 may include first communications sub-circuitry 542 configured to communicate the abnormality information to the electronic device through a wireless connection established with the electronic device. The first communications circuitry 540 may also include second communications sub-circuitry 544 configured to communicate, through a gateway device, the abnormality information to the electronic device belonging to the same LAN with the appliance. The first communications circuitry 540 may also include a third communications sub-circuitry 546 configured to communicate the abnormality information to the electronic device through the Internet.

The device can also include a first binding circuitry 500 configured to establish a binding relationship with the electronic device in advance.

Also, with the device for mode switching in FIG. 5, it is determined whether the abnormality problem prompted by the abnormality information is solved, and the abnormality recovery information is communicated to the electronic device if the abnormality problem prompted by the abnormality information is solved. This allows the abnormality problem to be monitored in real time. Also, with the device for mode switching in FIG. 5, an operation recovery signal is received from the electronic device, and the operation at the abnormality position is recovered according to the operation recovery signal. This allows for automatic recovery without manual operations. With the device for mode switching in FIG. 5, also the abnormality information is communicated to a server configured to make statistics of the abnormality information. This allows a manufacturer use statistics related to the abnormality information of appliances through the server.

Figure 6:
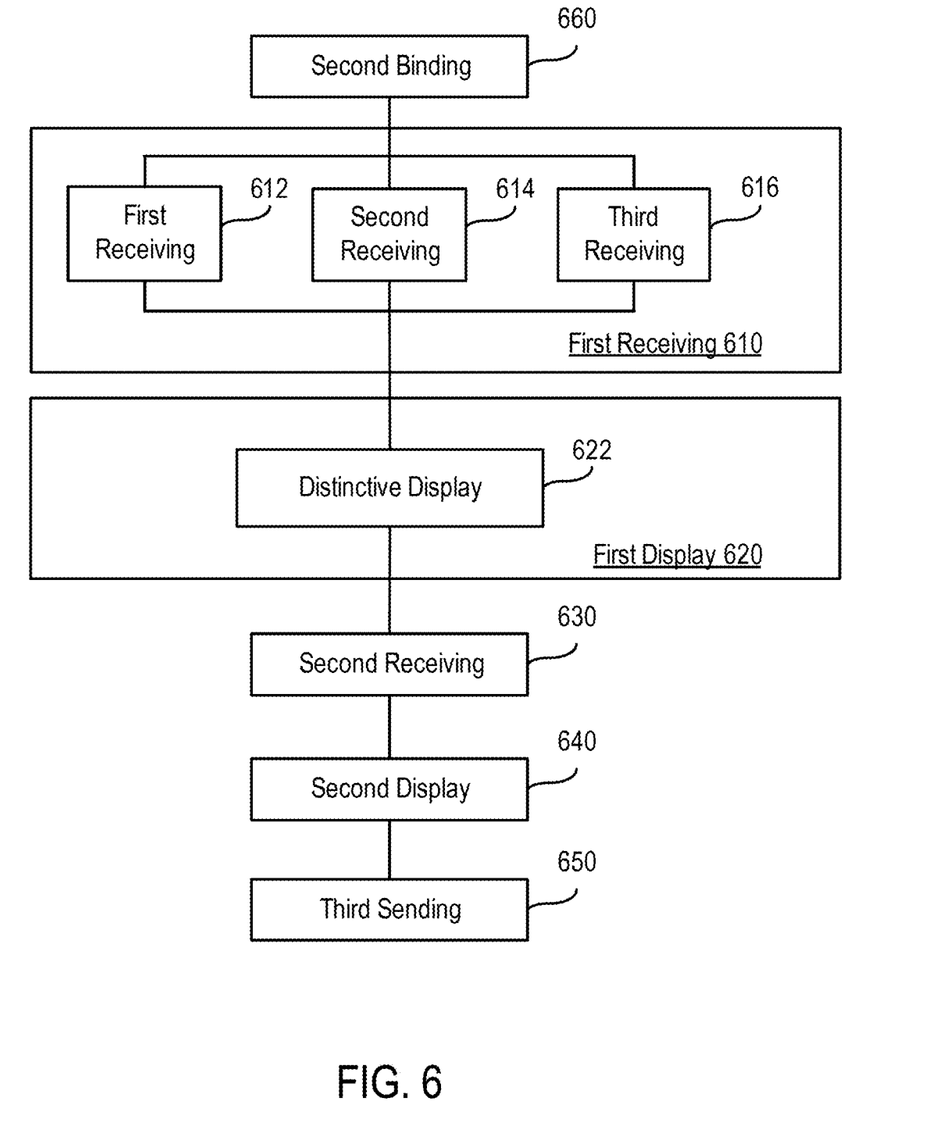

FIG. 6 is another block diagram of an example device for mode switching. This example device for mode switching may be implemented by software, hardware or a combination thereof. This device for mode switching may include first receiving circuitry 610 configured to receive abnormality information communicated by an appliance (such as a household electrical appliance). The abnormality information may be communicated by the appliance after the appliance detects that a self-operation status of appliance is abnormal. The device may also include first display circuitry 620 configured to display the abnormality information on a display interface of the electronic device. The abnormality information may include at least one of an abnormality position, an abnormality problem, abnormality time, and an abnormality image.

The first display circuitry 620 may include display sub-circuitry 622 configured to, when the abnormality position in the abnormality information is displayed in a block diagram of the appliance, distinctively display the abnormality position and other positions in the block diagram of the appliance. The distinctive display including at least one of distinctive display via colors, distinctive display via animations and distinctive display via profiles.

The device of FIG. 6 may also include second receiving circuitry 630 configured to receive abnormality recovery information communicated by the appliance. The abnormality recovery information being communicated by the appliance after the appliance detects that the abnormality problem is solved. The device of FIG. 6 may also include second display circuitry 640 configured to display the abnormality recovery information on the display interface of the electronic device. The device may also include third communications circuitry 650 configured to communicate an operation recovery signal to the appliance. The operation recovery signal may be configured to instruct the appliance to recover the operation at the abnormality position.

The first receiving circuitry 610 may include first receiving sub-circuitry 612 configured to receive the abnormality information communicated by the appliance through a wireless connection established with the appliance. The first receiving circuitry 610 may also include second receiving sub-circuitry 614 configured to receive, through a gateway device, the abnormality information communicated by the appliance belonging to the same LAN with the appliance. The first receiving circuitry 610 may also include third receiving sub-circuitry 616 configured to receive the abnormality information communicated by the appliance through the Internet. The device illustrated in FIG. 6 may also include a second binding circuitry 660 configured to establish a binding relationship with the appliance in advance.

Figure 7:
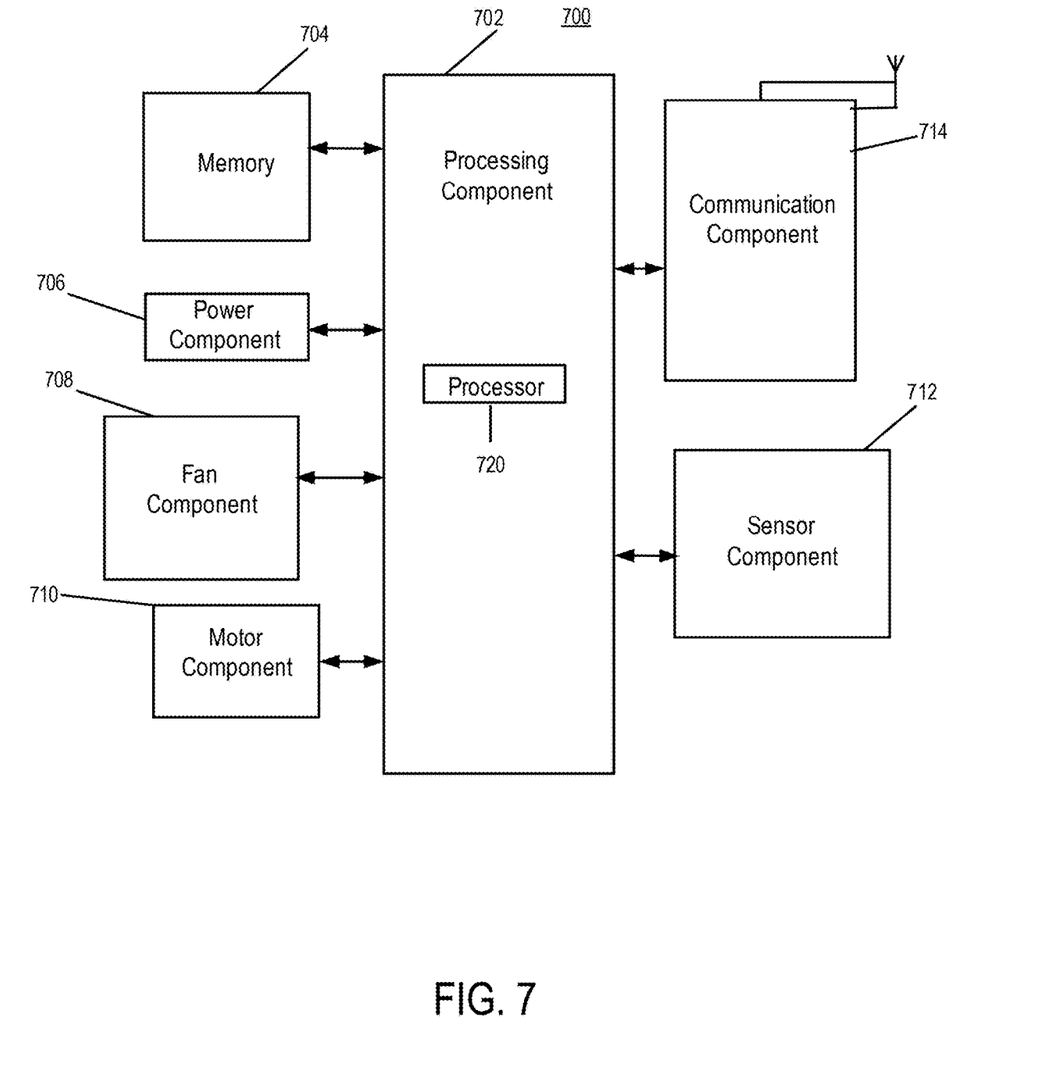

FIG. 7 is a block diagram of an example device 700 for mode switching. The device may be an appliance. The device 700 may include one or more of the following components: a processing component 702, a memory 704, a power component 706, a fan component 708, a motor component 710, a sensor component 712, and a communication component 714. The processing component 702 typically controls overall operations of the device 700, such as the operations associated with display, and data communications. The processing component 702 may include one or more processors 720 to execute instructions to perform at least some of the operations in the methods described herein. The processing component 702 may include one or more circuitries which facilitate the interaction between the processing component 702 and other components.

The memory 704 is configured to store various types of data to support the operation of the device 700. Examples of such data include instructions for any applications or methods operated on the device 700. Memory may be implemented using any type of volatile or non-volatile memory devices, or a combination thereof, such as a static random access memory (SRAM), an electrically erasable programmable read-memory (EEPROM), an erasable programmable read-memory (EPROM), a programmable read-memory (PROM), a read-memory (ROM), a magnetic memory, a flash memory, a magnetic or optical disk.

The power component 706 may provide power to various components of the device 700. A power component may include a power management system, one or more power sources, and any other components associated with the generation, management, and distribution of power in the device 700. The fan component 708 may be a component for that may improve the air quality in the device 700. The motor component 710 may be an electromagnetic device in the device 700 that converts or transfers electric energy according to induction. The motor may be letter M (represented by D in the old standard) in an electric circuit, which typically produces a driving torque, functioning as the power source of electric appliances or various machines. The sensor component 712 may include one or more sensors to provide status assessments of various aspects of the device 700.

The communication component 714 is configured to facilitate communication, wired or wirelessly, between the device 700 and other devices. The device 700 can access a wireless network based on a communication standard, such as WiFi, 2G, or 3G, or a combination thereof. In an example, the communication component 714 receives a broadcast signal or broadcast associated information from an external broadcast management system via a broadcast channel. Communication components can further include a near field communication (NFC) circuitry to facilitate short-range communications. For example, the NFC circuitry may be implemented based on a radio frequency identification (RFID) technology, an infrared data association (IrDA) technology, an ultra-wideband (UWB) technology, a Bluetooth (BT) technology, and other technologies.

Any of the devices described herein, such as the device 700, may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The components for device 700 can be used for performing the described methods for mode switching, such as illustrated in FIGS. 1 and 4.

In examples, a non-transitory computer readable storage medium including instructions, such as included in the memory 704, and executable by the processor 720 in the device 700, may perform or direct the methods illustrated in FIGS. 1 and 4. Non-transitory computer-readable storage mediums may include a ROM, a RAM, a CD-ROM, a magnetic tape, a floppy disc, an optical data storage device, or any combination thereof.

Figure 8:
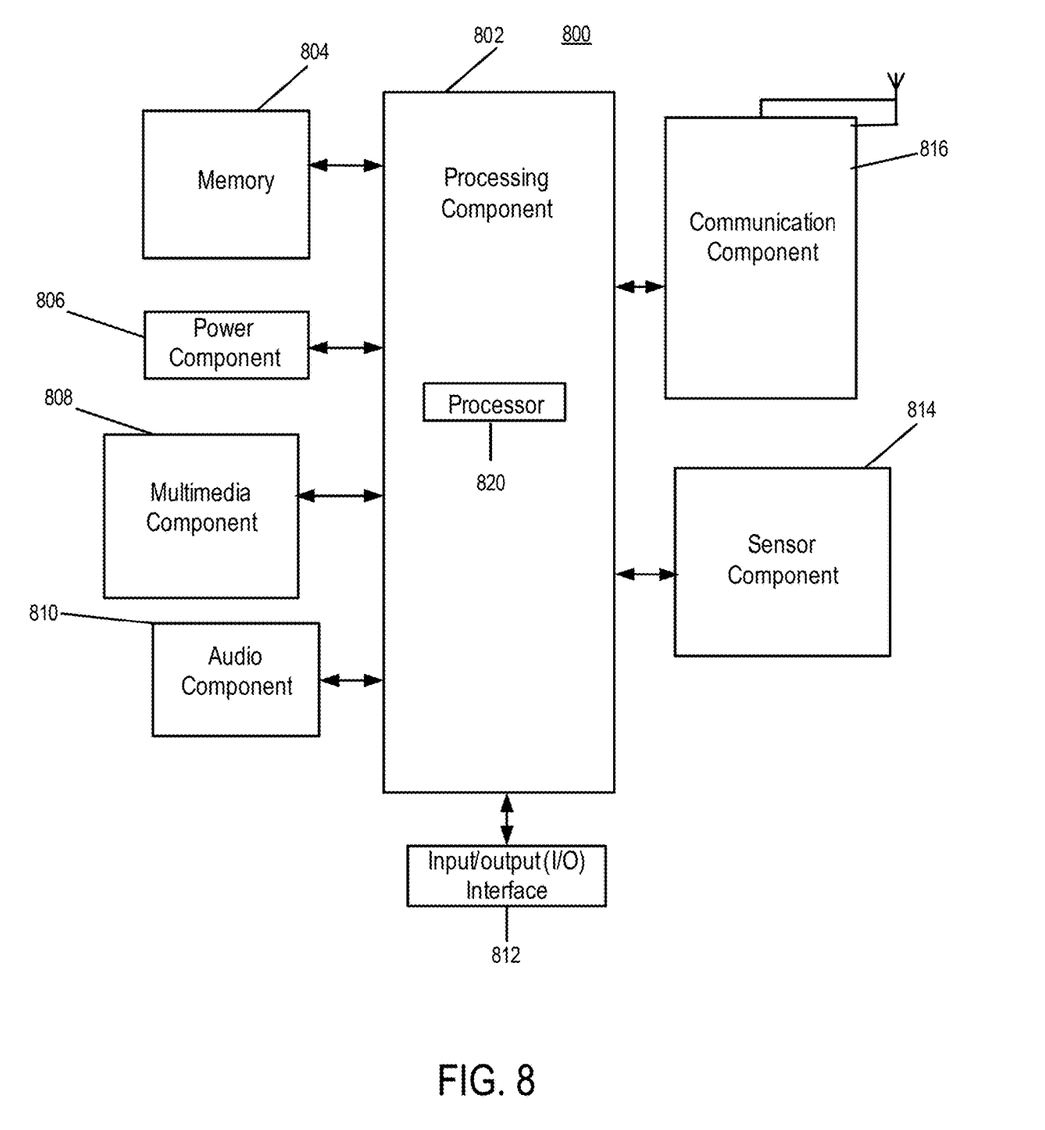

FIG. 8 is a block diagram of an example device 800 for mode switching. The device 800 may be an electronic device, for example, the device 800 may be a mobile phone (such as a smart phone), a personal computer (such as a tablet computer), a digital broadcast terminal, a messaging device, a gaming console, a medical device, exercise equipment, a personal digital assistant, or any combination thereof. The device 800 may include one or more of the following components: a processing component 802, a memory 804, a power component 806, a multimedia component 808, an audio component 810, an input/output (I/O) interface 812, a sensor component 814, and a communication component 816.

The processing component 802 may control overall operations of the device 800, such as the operations associated with display, telephone calls, data communications, camera operations, and recording operations. The processing component 802 may include one or more processors 820 to execute instructions to perform at least some of the operations of the methods described herein. Moreover, the processing component 802 may include one or more circuitries which facilitate the interaction between the processing component 802 and other components. For instance, the processing component 802 may include a multimedia circuitry to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, images, video, etc. The power component 806 provides power to various components of the device 800.

The multimedia component 808 may include a screen providing an output interface between the device 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not sense a boundary of a touch or swipe action, but also sense a period of time and a pressure associated with the touch or swipe action. In some examples, the multimedia component 808 includes a front camera and/or a rear camera. The front camera and/or the rear camera may receive an external multimedia datum while the device 800 is in an operation mode, such as a photographing mode or a video mode. The front camera and the rear camera may be a fixed optical lens system or have focus and optical zoom capability.

The audio component 810 is configured to output and/or input audio signals. For example, the audio component 810 may include a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface circuitries, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In an example, the communication component 816 receives a broadcast signal or broadcast associated information from an external broadcast management system via a broadcast channel.

In examples, the device 800 may be implemented with one or more electronic components. The components for device 800 can be used for performing aspects the methods for mode switching described herein. In examples, there may also be a non-transitory computer readable storage medium including instructions, such as included in the memory 804, executable by the processor 820 in the device 800, for performing aspects of the methods described herein.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only with a true scope and spirit of the invention being indicated by the appended claims.

It should be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. A method, comprising:
 determining, by a circuitry of an air purifier, that an operation of the air purifier is abnormal,
 wherein the determination includes sensing that a door of the air purifier is open for a predetermined period of time and identifying that the operation of the air purifier is an abnormal operation according to the sensing that the door is open for the predetermined period of time;

switching, by the circuitry, the operation of the air purifier to a safe mode when determining that the operation of the air purifier is abnormal, wherein the safe mode includes stopping or reducing speed of rotation of a fan in the air purifier;

communicating, by the circuitry, information regarding that the door is open for the predetermined period of time to an electronic device due to the abnormal operation of the air purifier; and communicating, to the electronic device, the information regarding that the abnormal operation was resolved when determining that the abnormal operation was resolved, which includes sensing that the door is closed, wherein the circuitry is communicatively coupled with the electronic device, the electronic device displays the information on a display device to show the abnormal operation of the air purifier and displays on the display device abnormality recovery information to be compared with the information to show the abnormal operation of the air purifier, and the information includes a position of the door, an issue with the door, a time associated with the position and the issue, and an image of the door at the time associated with the position and the issue.

2. The method according to claim 1, wherein the communication to the electronic device is over a local area network, a wide area network, a wireless network, or any combination thereof.

3. The method according to claim 1, further comprising:
communicating, by the circuitry, the information regarding that the door is open for the predetermined period of time, to a server, wherein the circuitry is communicatively coupled with the server and the server generates statistics according to the information.

4. The method according to claim 3, wherein the communications to the server are over a local area network, a wide area network, a wireless network, or any combination thereof.

5. The method according to claim 1, wherein the display device displays information regarding that the abnormal operation was resolved.

6. The method according to claim 5, wherein the communications to the electronic device are over a local area network, a wide area network, a wireless network, or any combination thereof.

7. The method according to claim 1, further comprising:
determining, by the circuitry, that the abnormal operation was resolved, which includes sensing that the door is closed;
communicating, to the electronic device, the information regarding that the abnormal operation was resolved, wherein the display device displays information regarding that the abnormal operation was resolved; and
communicating, by the circuitry, the information regarding that the abnormal operation was resolved, to a server, wherein the circuitry is communicatively coupled with the server and the server generates statistics according to the information regarding that the abnormal operation was resolved.

8. The method according to claim 7, wherein the communications to the server and the electronic device are over a local area network, a wide area network, a wireless network, or any combination thereof.

9. The method according to claim 1, wherein the information regarding that the door is open includes an image illustrating the abnormal operation.

10. The method according to claim 1, wherein the information regarding that the door is open includes an image illustrating how to resolve the abnormal operation.

11. The method according to claim 1, wherein the door of the air purifier includes at least one selected from a group consist of: a top door with blades, a lower door, and a back filter door.

12. The method according to claim 1, wherein the circuitry of the air purifier comprises a switch selected from a group consist of: an R-type switch, a microswitch and a magnetomotive switch, which is triggered when the door is opened; and the air purifier detects whether the door is opened through a trigger condition of the switch.

13. An air purifier, comprising:
a processor; and
a non-transitory computer readable medium, including:
instructions executable by the processor to determine that an operation of the air purifier is abnormal, wherein the determination includes sensing a foreign object in or on the air purifier for a predetermined period of time and identifying that the operation of the air purifier is an abnormal operation according to the sensing of the foreign object;
instructions executable by the processor to switch the abnormal operation of the air purifier to a safe mode when determining that the operation of the air purifier is abnormal, wherein the safe mode includes stopping or reducing speed of rotation of a fan in the air purifier;
instructions executable by the processor to direct a communications device in the air purifier to communicate information regarding the foreign object to an electronic device due to the abnormal operation of the air purifier; and
instructions executable by the processor to direct the communications device to communicate, to the electronic device and a server, information regarding that the abnormal operation was resolved when determining that the abnormal operation was resolved, which includes directing a sensor to sense that the foreign object is no longer present,
wherein the communications device is communicatively coupled with the electronic device, the electronic device displays the information on a display device to show the abnormal operation of the air purifier and displays on the display device abnormality recovery information to be compared with the information to show the abnormal operation of the air purifier, and the information includes a position of the foreign object, an issue with the foreign object, a time associated with the position and the issue, and an image of the foreign object at the time associated with the position and the issue.

14. The air purifier according to claim 13, further comprising instructions executable by the processor to direct the communications device to communicate the information regarding the foreign object to a server,
wherein the server is communicatively coupled to the communications device and the server generates statistics according to the information, and wherein the communications to the electronic device and the server are over a local area network, a wide area network, a wireless network, or any combination thereof.

15. The air purifier according to claim 13,
wherein the display device displays information regarding that the abnormal operation was resolved, wherein the server generates statistics according to the information regarding that the abnormal operation was resolved, and
wherein the communications to the electronic device and the server are over a local area network, a wide area network, a wireless network, or any combination thereof.

16. The air purifier according to claim 13, wherein the information regarding the foreign object includes a first image illustrating the abnormal operation and a second image illustrating how to resolve the abnormal operation.

17. A non-transitory computer readable medium, comprising:
instructions executable by a processor to determine that an operation of an air purifier is abnormal, wherein the determination includes:
sensing that the operation is obstructed by an external force and that the obstruction exceeds a predetermined threshold; and
identifying that the operation of the air purifier is an abnormal operation according to the sensing;
instructions executable by a processor to switch the abnormal operation of the air purifier to a safe mode when determining that the operation of the air purifier is abnormal, wherein the safe mode includes stopping or reducing speed of rotation of a fan in the air purifier;
instructions executable by a processor to direct a communications device in the air purifier to communicate information regarding the obstruction to an electronic device due to the abnormal operation of the air purifier; and
instructions executable by a processor to direct the communications device to communicate, to the electronic device and a server, information regarding that the abnormal operation was resolved when determining that the abnormal operation was resolved, which includes directing a sensor to sense that the obstruction is no longer present,
wherein the communications device is communicatively coupled with the electronic device, the electronic device displays the information on a display device to show the abnormal operation of the air purifier and displays on the display device abnormality recovery information to be compared with the information to show the abnormal operation of the air purifier, and the information includes a position of the obstruction, an issue with the obstruction, a time associated with the position and the issue, and an image of the obstruction at the time associated with the position and the issue, and
wherein the information regarding the obstruction includes a first image illustrating the abnormal operation and a second image illustrating how to resolve the abnormal operation.

18. The non-transitory computer readable medium according to claim 17, further comprising instructions executable by a processor to direct the communications device to communicate the information regarding the obstruction to a server, wherein the server is communicatively coupled to the communications device and the server generates statistics according to the information, and wherein the communications to the electronic device and the server are over a local area network, a wide area network, a wireless network, or any combination thereof.

19. The non-transitory computer readable medium according to claim 17,
wherein the display device displays information regarding that the abnormal operation was resolved, wherein the server generates statistics according to the information regarding that the abnormal operation was resolved, and
wherein the communications to the electronic device and the server are over a local area network, a wide area network, a wireless network, or any combination thereof.

* * * * *